United States Patent
Pila (10) Patent No.: US 10,044,927 B2
(45) Date of Patent: Aug. 7, 2018

(54) CAPTURING A STABLE IMAGE USING AN AMBIENT LIGHT SENSOR-BASED TRIGGER

(71) Applicant: STMicroelectronics International N.V., Schiphol (NL)

(72) Inventor: Rosarium Pila, Greater Noida (IN)

(73) Assignee: STMICROELECTRONICS INTERNATIONAL N.V., Schiphol (NL)

(*) Notice: Subject to any disclaimer, the term of this patent is extended or adjusted under 35 U.S.C. 154(b) by 133 days.

(21) Appl. No.: 14/886,944

(22) Filed: Oct. 19, 2015

(65) Prior Publication Data

US 2017/0111567 A1    Apr. 20, 2017

(51) Int. Cl.
*H04N 5/232* (2006.01)
*H04N 1/21* (2006.01)

(52) U.S. Cl.
CPC ....... *H04N 5/23216* (2013.01); *H04N 1/2112* (2013.01); *H04N 5/232* (2013.01); *H04N 5/23222* (2013.01)

(58) Field of Classification Search
CPC .................................................. H04N 5/23203
USPC ..................................................... 348/207.99
See application file for complete search history.

(56) References Cited

U.S. PATENT DOCUMENTS

| | | | |
|---|---|---|---|
| 7,593,632 B2 | 9/2009 | Schnell | |
| 9,449,561 B1* | 9/2016 | Umansky | G09G 5/003 |
| 2011/0158623 A1* | 6/2011 | Cheng | H04N 5/23203 396/102 |

OTHER PUBLICATIONS

Intersil Americas LLC, "Integrated Digital Light Sensor," ISL29034, Apr. 9, 2014, Rev. FN8370.1, 15 pgs.

* cited by examiner

*Primary Examiner* — Joel Fosselman
(74) *Attorney, Agent, or Firm* — Seed IP Law Group LLP (57) ABSTRACT

A method and apparatus for capturing stable images are disclosed. An ambient light sensor makes measurements of ambient light. A change in ambient light between two measurements is determined. If the change in ambient light measurements falls in a predefined range, then the change may be attributable to ambient light sensor being blocked by a user to trigger image capturing. Consequently, a camera is triggered to capture an image. Conversely, if the change in ambient light measurement is outside the range, image capturing is not triggered as the change may be attributable to other factors.

10 Claims, 6 Drawing Sheets

CAPTURING A STABLE IMAGE USING AN AMBIENT LIGHT SENSOR-BASED TRIGGER

BACKGROUND

Technical Field

This application is related to triggering the capturing of an image by a camera based on measurements of ambient light made by an ambient light sensor.

Description of the Related Art

Figure 1:
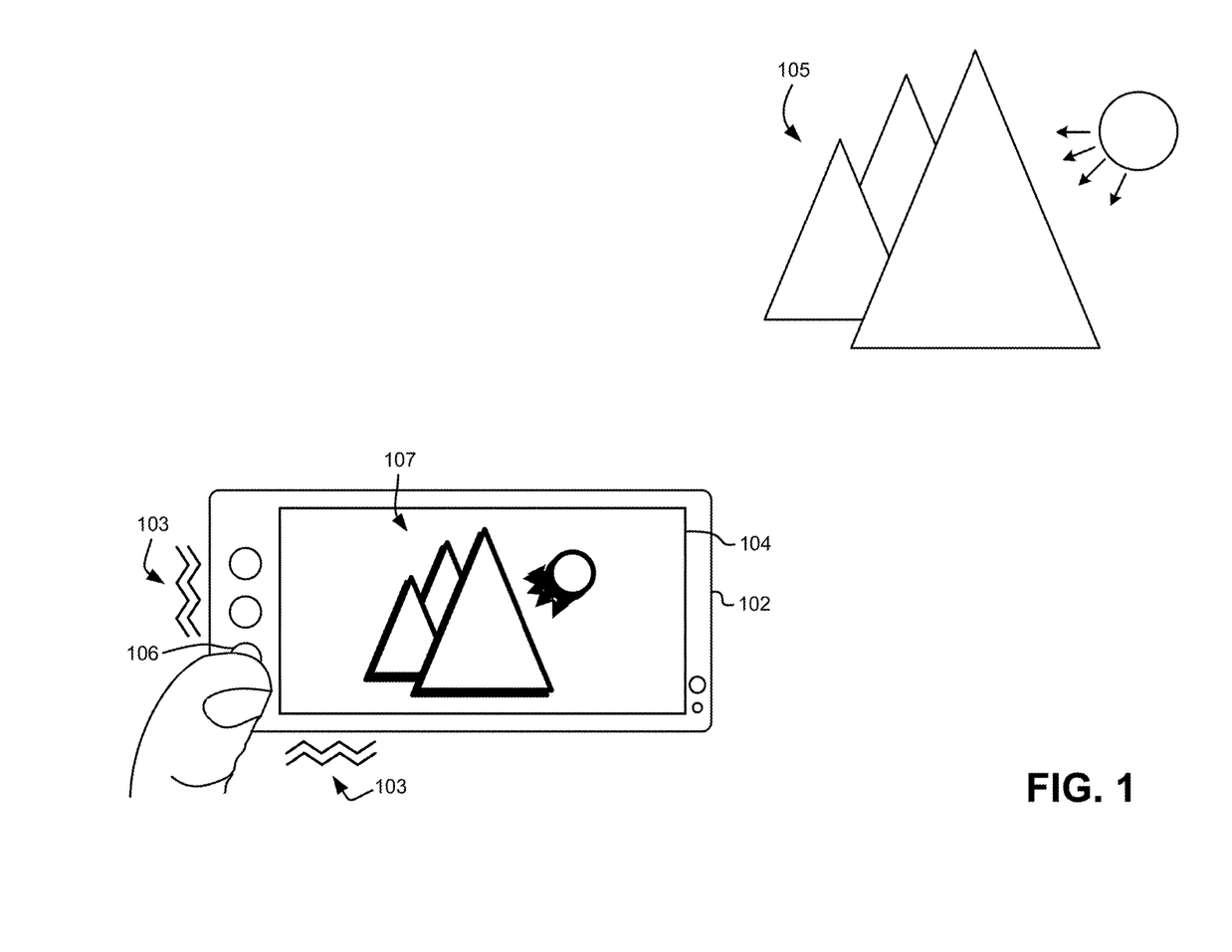
FIG. 1 shows an example of image capturing using a device equipped with a camera, according to the prior art.

FIG. 1 shows an example of image capturing using a device 102 equipped with a camera. The device 102 is shown in FIG. 1 to be a smartphone but may in various embodiments be a tablet, laptop or smart television, among others. The device 102, whose front is illustrated in FIG. 1, has a camera with a rear-facing lens disposed on the back of the device. The camera is said to be rear-facing in relation to a front-facing screen 104 of the device 102. The screen 104 may be a touchscreen and may receive user touch input in addition to displaying images, text and video.

The camera may be used for capturing images, namely taking a picture. The camera lens may be pointed at an object 105 and an image of the object in the field of view of the lens will be shown on the screen 104. The image may be captured in response to actuation of an image capture button 106. For example, the user will press the image capture button 106 to take a picture.

As an alternative to providing the image capture button 106 on the body at the device 102, the image may be captured by a user providing an input to the screen 104. For example, the user needs to touch any part of the screen 104 or a particular region of the screen 104 for the image to be captured.

As may be recognized, the quality of the captured image deteriorates and becomes blurry if the camera, or the device 102 in general, is moved or shaken while the image is being captured. Touching the device in order to trigger image capturing is undesirable because it often results in shaking the device at the moment when it is most desirable for the device's camera to be held steadily in order to take a sharp picture without blur. For a sharp and focused image to be taken, the device 102 must be as stable and held steady while the picture is taken. The application of pressure due to pressing the image capture button 106 or touching an area of the screen 104, for example, by a user's finger, typically results in some slight movement, such as shaking or jolting of the device 102, as shown by lines 103. As a result a blurry image is captured, as shown by blurry image 107. To mitigate the blur, some devices implement compensation algorithms that reduce the blur. However, these algorithms are computationally intensive and utilize a large amount of computing resources to perform, thus reducing available battery power in battery-powered devices. In addition, these algorithms cannot recover image data that is not captured and forever lost due to device 102 moving just at the moment the picture is taken.

BRIEF SUMMARY

Disclosed is a method and apparatus for capturing stable images. In the method and apparatus, a user is able to capture an image or take a picture with a camera-equipped device, such as a smartphone or a tablet, without touching the device or pressing a button on the device.

Devices, such as smartphones and tablets, often include an ambient light sensor. The ambient light sensor will measure the ambient light in a proximity of the device. The ambient light measurements made by the ambient light sensor are often used to adjust screen brightness so that if the device is being used in a well-lit or bright area, the screen brightness is increased to make content displayed on the screen more visible in the bright conditions. Conversely, if the device is used in a dark area, the screen brightness is reduced for more suitable or eye-pleasing viewing. The ambient light sensor is typically front-facing towards the user and positioned near the screen, whereas the device's main camera is back-facing and positioned on the back of the device. The ambient light sensor may, therefore, be put to a second use, namely to cause the camera to take the picture.

To trigger image capturing, the user may wave their hand to block a portion of the ambient light sensed by the ambient light sensor. The user may hold the device with one hand and look at the screen to see a preview of the image detected by the camera. When the user wants to take a picture, the user may wave their other hand over the front-facing ambient light sensor or otherwise block a portion of light sensed by the ambient light sensor. When the ambient light sensor detects a change in ambient light that may be attributable to the user having waved her or his hand over the ambient light sensor or otherwise blocking light from arriving at the ambient light sensor, the camera is triggered to take a picture. Thus, an image may be captured and the picture taken without the need to touch the device, which reduces the chance the camera will be moving at the very same instance that a picture is taken. Therefore, shaking, touching or bumping the camera at the time the picture is taken is avoided altogether.

DETAILED DESCRIPTION

Figure 2:
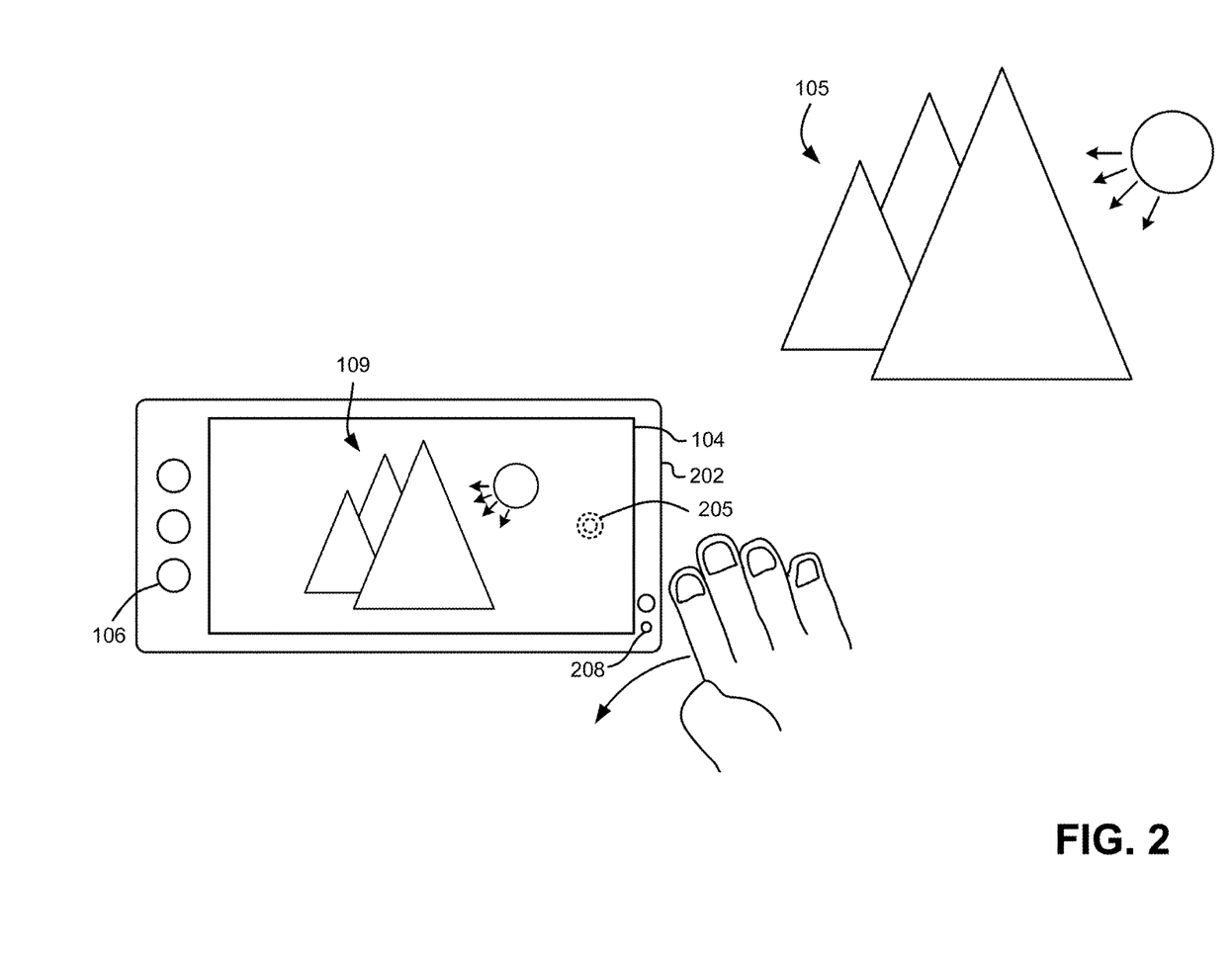
FIG. 2 shows an example of using a device's ambient light sensor for triggering capture of an image.

FIG. 2 shows an example of using a device's 202 ambient light sensor 208 for triggering capture of an image. Similar to the device 102 described with reference to FIG. 1, the device 202 includes a screen 104 and a camera 203. The device 202 also includes the ambient light sensor 208. The ambient light sensor 208 as described herein may include any acceptable light sensor, such as a photodiode, and measures illuminance (luminous flux or luminous emittance) in proximity of the ambient light sensor 208. The illuminance is an intensity of light as perceived by the human eye and is measured in units of lux. A lux is one lumen per square meter ($m^2$). Illuminance typically ranges from zero lux to over 100,000 lux. For example, typical office lighting is in the range of 350 to 500 lux, whereas direct sunlight may have an illuminance of 50,000 lux or more.

Most cameras in use today have a built in ambient light sensor. The ambient light sensor 208 is usually included in the device 202 so the brightness of the screen 104 may be adjusted based on the lighting conditions surrounding the device 202. If the device 202 is used in a dark area then a relatively low illuminance measurement will be made by the ambient light sensor 208. Based on the relatively low illuminance measurement, the brightness of the screen 104 will be reduced. Conversely, if the device 202 is used in a bright area then a relatively high illuminance measurement will be made and the brightness of the screen 104 will be increased so that content shown on the screen 104 will be more clearly visible under bright external conditions.

Depending upon the configuration and software used in the camera 203, the ambient light sensor 208 may measure ambient light at any desired interval. For example, the measurements may be made many times per second, 5-10 times per second, once every second, or any other interval.

According to the principles as taught herein, ambient light sensor 208 is used to trigger the capturing of an image, namely, taking a picture by the camera of the device 202. As described herein, it is advantageous for a user to be able to trigger capturing the image without touching or pressing upon the device 202. That is because touching or pressing the device 202 applies pressure to the device 202 and results in moving the device 202 at a moment when it is most desirable for the device 202 to be held steadily to capture a sharp image without blur.

To trigger the camera to take a picture, the user may, for example, instead wave their hand or motion an object so as to block some of the ambient light sensed by the ambient light sensor 208. Blocking the ambient light will result in a change in a measurement of the ambient light made by the ambient light sensor 208. As a result of the hand motion, reduced ambient light will be sensed by the ambient light sensor 208 as compared to a previous ambient light measurement. Detection of a change between a first ambient light measurement taken before the ambient light was blocked and a second ambient light measurement taken after the ambient light was blocked will be used to trigger capturing the image by the camera. As can be seen in FIG. 2, the device 202 does not move when the hand passes over the ambient light sensor, as compared to the movement of FIG. 1. As a result of the device 202 being steady when the picture is taken, the scene 105 is clear in the camera, as shown by image 109, as compared to blurry image 107 of the prior art. It is noted that although triggering the capture of an image is described herein, when the ambient light is blocked, other actions may be triggered such as recording a video, making a call and recording audio using a microphone, among others.

Figure 3:
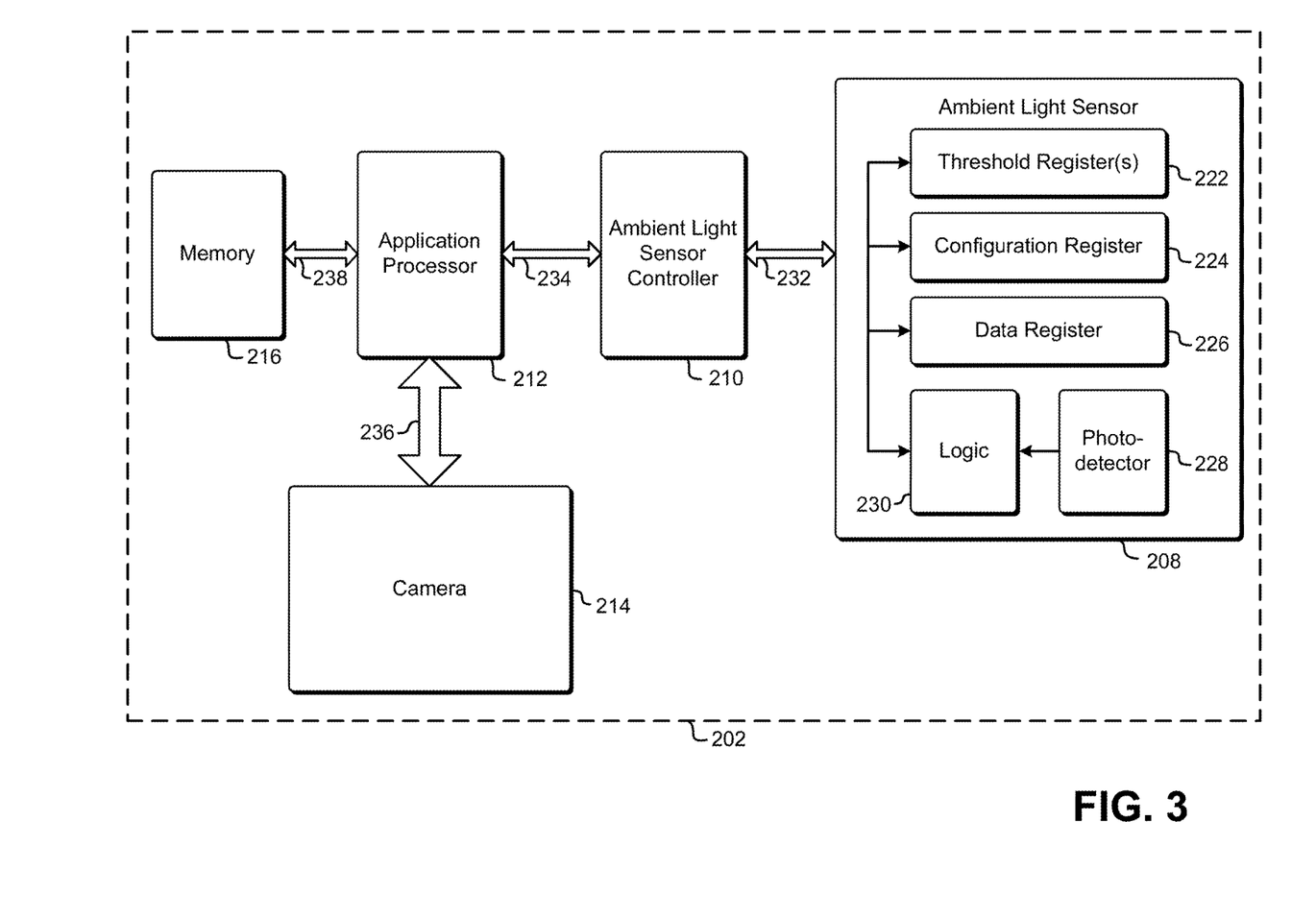
FIG. 3 shows a block diagram of a camera-equipped device.

FIG. 3 shows a block diagram of the device 202. The device comprises the ambient light sensor 208, a controller 210 of the ambient light sensor 208, an application processor 212, a camera 214 and memory 216. It is noted that in alternative embodiments the device 202 may include additional or different components than those described with reference to FIG. 3.

The ambient light sensor 208 comprises one or more threshold registers 222, a configuration register 224, a data register 226, a photodetector 228 and logic 230. The photodetector 228, which may be a photodiode or any other light sensing element, is electrically coupled to the logic 230. Furthermore, the registers 222-226 are also electrically coupled to the logic 230.

The ambient light sensor 208 is electrically coupled to the controller 210 by a first interface 232, which may be an Inter-Integrated Circuit ($I^2C$) bus by which the ambient light sensor 208 and the controller 210 may communicate in accordance with any protocol. Similarly, the controller 210 is electrically coupled to the application processing by a second interface 234 and the application processor 212 is electrically coupled to the camera 214 and the memory 216 using a third interface 236 and a fourth interface 238, respectively.

The photodetector 228 measures ambient light to produce an ambient light measurement and output the ambient light measurement to the logic 230. Various ambient light measurements may be made at various points in time. For example, the photodetector 228 may make the ambient light measurements periodically or aperiodically. The logic 230, which may include an analog-to-digital converter, among other components, receives the ambient light measurements. The logic 230 may convert an analog ambient light measurement to digital format. The logic 230 stores one or more ambient light measurements in the data register 226. In addition, an indication of time at which an ambient light measurement was taken may also be stored in the data register 226. The logic 230 may store ambient light measurements taken over a period of time in the data register 226.

The configuration register 224 may store data used for initializing the ambient light sensor 208. For example, the data in the configuration register 224 may dictate an initial state of the ambient light sensor 208 and the manner in which the ambient light sensor 208 operates. Various fields of the configuration register 224 may specify the configurations of the ambient light sensor 208.

According to one embodiment, the logic 230 compares a first ambient light measurement made by the photodetector 228 at a first time period (denoted as $M_1$) to a second ambient light measurement made by the photodetector 228 at a second time period subsequent to the first time period (denoted as $M_2$). The logic 230 may determine a change of the ambient light measurements between the first time period and the second time period. The change may be a difference in the ambient light measurement and may be calculated as $M_2 - M_1$. The change may also be a percentage change of the second ambient light measurement over the first ambient light measurement. The percentage change may be calculated as $$\frac{|M_2 - M_1|}{M_1} \cdot 100,$$

where |.| denotes the absolute value operator.

The photodetector 228 senses ambient light and determines the first ambient light measurement. The photodetector 228 outputs the first ambient light measurement to the logic 230. The logic may convert the first ambient light measurement from analog format to digital format and cause the first ambient light measurement to be stored in the data register 226.

The photodetector 228 will subsequently sense ambient light and determine the second ambient light measurement. The photodetector 228 outputs the second ambient light measurement to the logic 230. The logic 230 may convert the second ambient light measurement from analog format to digital format. The logic 230 then retrieves the first ambient light measurement from the data register 226. The logic 230 then determines a change in ambient light measurement between the second ambient light measurement and the first ambient light measurement.

The logic 230 may then retrieve the one or more thresholds stored in the threshold register 222. The logic 230 compares the change in ambient light measurement to one or more thresholds. The threshold register 222 may store one threshold value. If the change in ambient light measurement exceeds the threshold it may be indicative that ambient light sensed by the ambient light sensor 208 was blocked (for example, by an object such a user's hand) in order to trigger taking a picture. For example, the threshold may be 5% and if the change in the ambient light measurement is determined to exceed 5% then the change may be indicative that the user intentionally blocked some of the ambient light detected by the photodetector 228. Consequently, it is determined that a picture should be taken. Conversely, if the change is less than 5%, then the change in the ambient light measurement may be deemed to be attributed to changes in lighting conditions or variations in sensor 208 reading as opposed to blocking the sensor 208. Consequently, a picture is not taken.

The threshold register 222 may, in some embodiments, store a low threshold and a high threshold. A picture is taken if the change in the ambient light measurement is between the two thresholds. Otherwise, if the change in the ambient light measurement is less than the low threshold or greater than the high threshold, then a picture is not taken. By way of example, the low threshold may be 2% and the high threshold may be 10% and a picture may be taken if the change in the ambient light measurement if determined to be between the two thresholds.

The use of a low and a high threshold is advantageous because image capturing is not triggered by small changes in ambient light measurement that may be attributed to small variations in measurement from one sensor reading to another. Further, image capturing will not be triggered by large changes in ambient light measurements that may be attributed to a light in the room in which the device 202 is used being turned off or a user placing the device 202 in their pocket or handbag, for example. The low and high thresholds may be set based on observations of changes in ambient light measurements that are due to a user placing or waving their hand near the ambient light sensor so as to trigger taking a photograph.

When the embodiment having two thresholds is being used, the ambient light sensor 208 will provide a first output signal to the controller 210 as a result of determining that the change in ambient light measurement is between the two thresholds. Alternatively, when only one threshold is being used, the first output signal is provided if the change in ambient light measurement is greater than the threshold.

The first output signal is provided over the first interface 232. The first output signal may in various embodiments be an interrupt that is recognized by those skilled in the art. In response to receipt of the first output signal, the controller outputs a second output signal to the application processor 212 over the second interface 234. The application processor 212, which may be the central processing unit (CPU) of the device 202, receives the second output signal. In response to receiving the second output signal, the application processor 212 of the device 202 outputs an image capture command to the camera 214 over the third interface 236.

In response to receiving the image capture command, the camera 214 captures an image and outputs the image to the application processor 212 over the third interface 236. The application processor 212 may in turn cause the image to be stored in the memory 216. It is recognized that the camera 214 may instead output the image directly to the memory 216 for storage without the intervening application processor 212.

In the case where an image is captured, as well the case where an image is not captured, the logic 230 stores the second ambient light measurement in the data register 226. If the data register 226 is configured to only store one ambient light measurement, the second ambient light measurement may replace the first ambient light measurement in the data register 226. The stored second ambient light measurement may be used as a basis for comparison with a subsequently determined third ambient light measurement and determining whether an image should be captured using the camera 214. The process of determining the change of ambient light measurements may be continually performed and the determination may be used for deciding whether an image should be captured.

Figure 4:
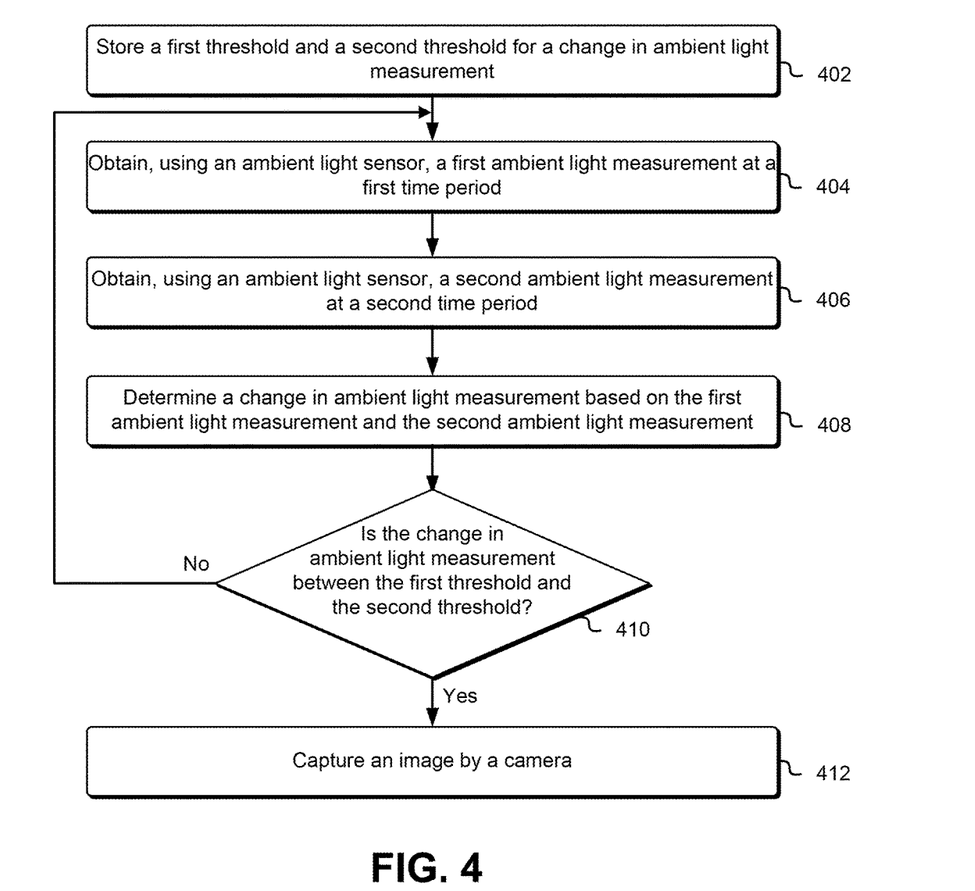
FIG. 4 shows a flow diagram of a method for capturing an image based on ambient light measurements.

FIG. 4 shows a flow diagram of a method for capturing an image based on ambient light measurements. In the method, a register, such as the threshold register 222 described with reference to FIG. 3, stores at 402 a first threshold and a second threshold for a change in ambient light measurement. Then an ambient light sensor, such as the ambient light sensor 208 described with reference to FIG. 3, obtains at 404 a first ambient light measurement at a first time period. The ambient light sensor also obtains at 406 a second ambient light measurement at a second time period. As described herein, the second time period may be after the first time period.

The ambient light sensor then determines at 408 a change in ambient light measurement based on the first ambient light measurement and the second ambient light measurement. The change may be a percentage change of the second ambient light measurement over the first ambient light measurement. The ambient light sensor determines at 410 whether the change in the ambient light measurement is between the first threshold and the second threshold. If a positive determination is made, a camera, such as the camera 214 described with reference to FIG. 3, captures at 412 an image. If a negative determination is made, the method reverts to obtaining a subsequent ambient light measurement and determining a change in ambient light measurement based on the subsequent ambient light measurement and a prior ambient light measurement, such as the second ambient light measurement.

Figure 5:
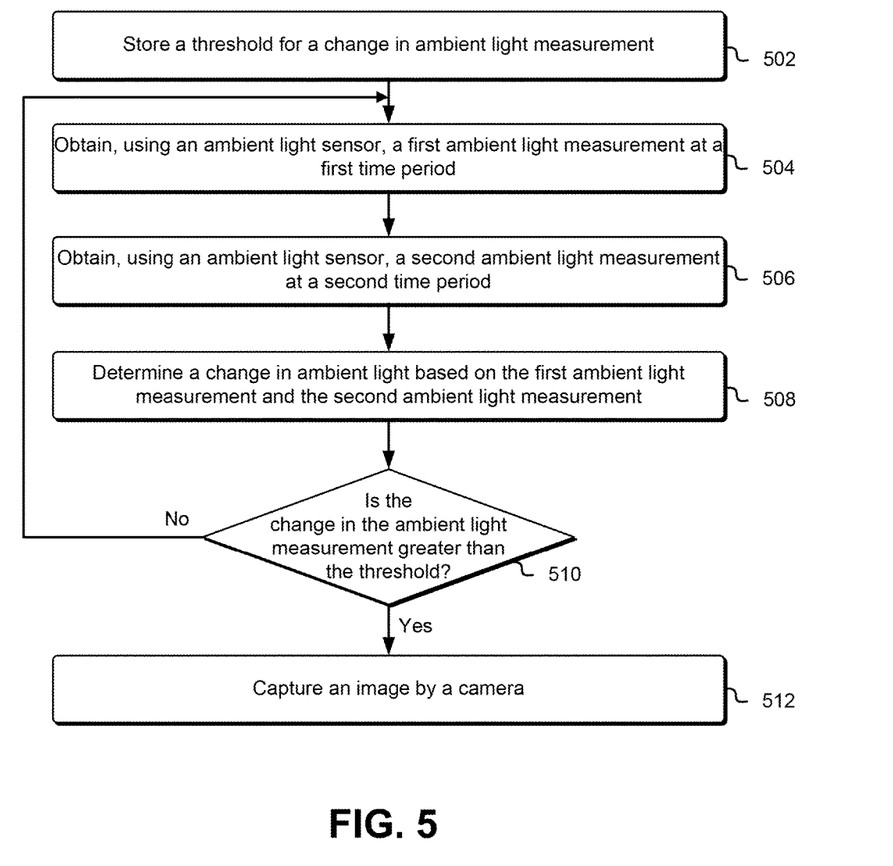
FIG. 5 shows a flow diagram of a method for capturing an image based on ambient light measurements.

FIG. 5 shows a flow diagram of a method for capturing an image based on ambient light measurements. In the method, a register, such as the threshold register 222 described with reference to FIG. 3, stores at 502 a threshold for a change in ambient light measurement. Then an ambient light sensor, such as the ambient light sensor 208 described with reference to FIG. 3, obtains at 504 a first ambient light measurement at a first time period. The ambient light sensor also obtains at 506 a second ambient light measurement at a second time period. As described herein, the second time period may be after the first time period.

The ambient light sensor then determines at 508 a change in ambient light measurement based on the first ambient light measurement and the second ambient light measurement. The change may be a percentage change of the second ambient light measurement over the first ambient light measurement or a difference between the ambient light measurements as described herein. The ambient light sensor determines at 510 if the change in the ambient light measurement is greater than the threshold. If a positive determination is made, a camera, such as the camera 214 described with reference to FIG. 3, captures at 512 an image.

If a negative determination is made, the method reverts to obtaining a subsequent ambient light measurement (for example, a third ambient light measurement) and determining a change of ambient light measurement between the subsequent ambient light measurement and a previously obtained ambient light measurement (for example, the second ambient light measurement).

Figure 6:
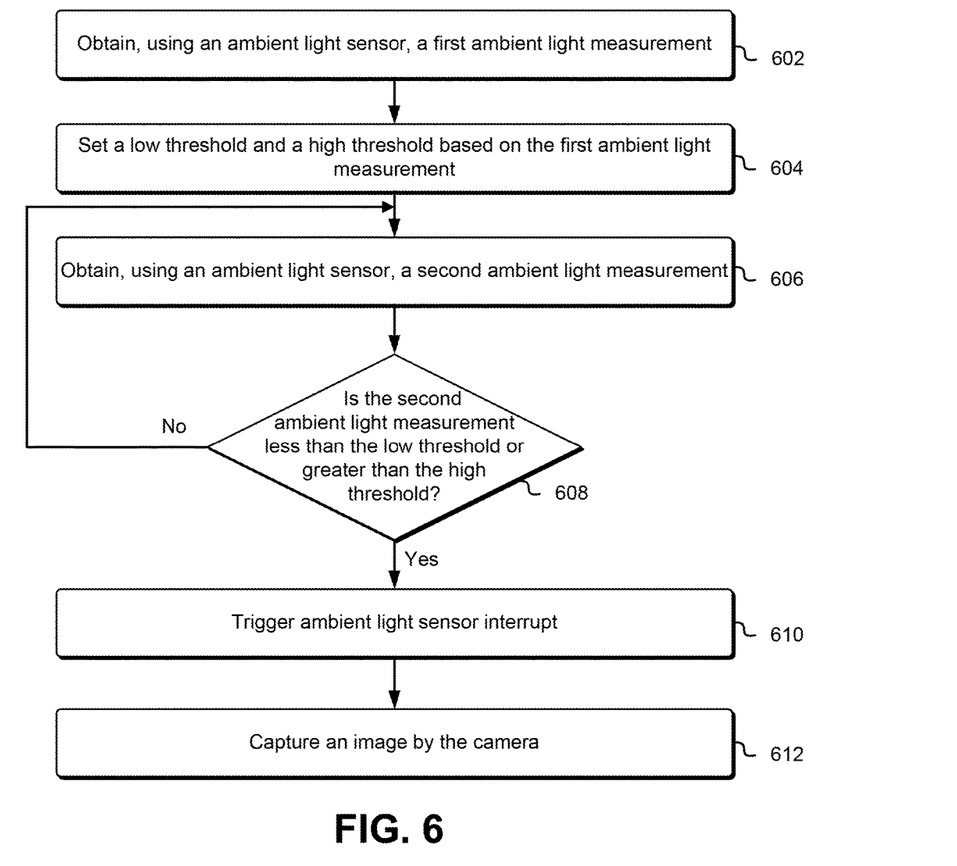
FIG. 6 shows a flow diagram of a method for capturing an image based on ambient light measurements.

FIG. 6 shows a flow diagram of a method for capturing an image based on ambient light measurements. In the method, an ambient light sensor, such as the ambient light sensor 208 described with reference to FIG. 3, obtains at 602 a first ambient light measurement. The ambient light measurement may be an illuminance measurement as described herein. By way of example, the measurement value may be 500 lux. The ambient light sensor at 604 sets a low threshold and a high threshold based on the first ambient light measurement. The low threshold and the high threshold may be stored in the threshold registers 222. The low threshold and the high threshold may be set to be within a margin of the first ambient light measurement. The margin may be any percentage, such as 10% or 20%. If the margin is 10%, the low threshold may be set to be 10% less than the first ambient light measurement and the high threshold may be set to be 10% greater than the first ambient light measurement. Continuing with the example above where the first ambient light measurement is 500 lux, if the margin is 10%, then the low threshold is set to 450 lux (or 10% less than the first ambient light measurement of 500 lux) and the high threshold is set to 550 lux (or 10% greater than the first ambient light measurement of 500 lux).

The ambient light sensor at 606 obtains a second ambient light measurement. The ambient light sensor at 608 determines if the second ambient light measurement is less than the low threshold or greater than the high threshold. If a negative determination is made, the method reverts to obtaining another ambient light measurement at 606. If a positive determination is made, the ambient light sensor triggers an interrupt at 610. In response to triggering the interrupt, a camera, such as the camera described with reference to numeral 214 in FIG. 3, captures an image at 612.

It is noted that triggering image capture based on ambient light measurement may be disabled if a camera application of the device 202 is closed or not in use. Triggering image capture based on ambient light measurement may be enabled if the camera application of the device 202 is opened. That is because users are most likely to take pictures when the camera application is in use and they are able to see a preview of the picture on the screen 104.

In alternative embodiments, a proximity sensor may be used to trigger image capture. The proximity sensor may measure a distance between the proximity sensor and an object in a field of view of the proximity sensor. Image capturing may be triggered if a distance measurement made by the proximity sensor is determined to be below a threshold or between two thresholds as described herein.

In various embodiments, the change in ambient light measurement may be calculated as an absolute change. When the change is an absolute change, an increase in the ambient light measurement (for example, due to a light being turned on) may trigger capturing an image, as may a decrease that results from the sensor being partially blocked.

In other embodiments, the change in the ambient light measurement may be a directional change calculated without an absolute value operator. For example, the directional percentage change in the ambient light measurement may be calculated as $$\frac{M_2 - M_1}{M_1} \cdot 100.$$

When a directional change is determined, the thresholds may be percentages having a negative value. If the percentages are, for example, −2% and −10%, then only a reduction in ambient light (for example, as a result of obstructing the ambient light sensor) triggers image capturing. Increasing the ambient light will result in a positive change in ambient light measurement and will not trigger image capturing.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for capturing an image by a mobile device camera, comprising:
   storing a first threshold for a change in ambient light measurement;
   determining, by an ambient light sensor, a first measurement of ambient light taken at a first time period;
   determining, by the ambient light sensor, a second measurement of ambient light taken at a second time period subsequent to the first time period;
   determining the change in the ambient light measurement based on the first measurement and the second measurement;
   determining that the change in the ambient light measurement is greater than the first threshold;
   detecting, based at least in part on determining the change in the ambient light measurement is greater than the first threshold, that a sensory range of the ambient light sensor was obstructed by a light-blocking object;
   in response to detecting that the ambient light sensor was obstructed, causing the mobile device camera to take a picture;
   storing the picture;
   detecting that the change from the first measurement to the second measurement is not greater than the first threshold; and
   in response to detecting that the change from the first measurement to the second measurement is not greater than the first threshold, refraining from causing the mobile device camera to take the picture.

2. The method of claim 1, wherein the change in the ambient light measurement is a difference between the second measurement and the first measurement.

3. The method of claim 1, wherein the change in the ambient light measurement is a percentage change of the second measurement over the first measurement.

4. The method of claim 1, further comprising:
   repeating determining, by the ambient light sensor, the first measurement of ambient light taken at the first time period and determining, by the ambient light sensor, the second measurement of ambient light taken at the second time period subsequent to the first time period.

5. The method of claim 4, further comprising:

repeating determining the change in the ambient light measurement based on the first measurement and the second measurement, determining that the change in the ambient light measurement is greater than the first threshold and detecting, based at least in part on determining the change in the ambient light measurement is greater than the first threshold, that the sensory range of the ambient light sensor was obstructed by a light-blocking object.

6. The method of claim 5, further comprising:

repeating in response to detecting that the ambient light sensor was obstructed, causing the mobile device camera to take the picture and storing the picture.

7. A method for capturing an image by a mobile device camera, comprising:

storing a first threshold and a second threshold for a change in ambient light measurement;

determining, by an ambient light sensor, a first measurement of ambient light taken at a first time period;

determining, by the ambient light sensor, a second measurement of ambient light taken at a second time period subsequent to the first time period;

determining the change in the ambient light measurement based on the first measurement and the second measurement;

determining that the change in the ambient light measurement is greater than the first threshold and less than the second threshold;

detecting, based at least in part on determining the change in the ambient light measurement is greater than the first threshold and less than the second threshold, that the ambient light sensor was obstructed by a light blocking object;

in response to detecting that the ambient light sensor was obstructed, causing the mobile device camera to take a picture; and storing the picture.

8. The method of claim 7, further comprising:

repeating determining, by the ambient light sensor, the first measurement of ambient light taken at the first time period and determining, by the ambient light sensor, the second measurement of ambient light taken at the second time period subsequent to the first time period.

9. The method of claim 8, further comprising:

repeating determining the change in the ambient light measurement based on the first measurement and the second measurement, determining that the change in the ambient light measurement is greater than the first threshold and less than the second threshold and detecting, based at least in part on determining the change in the ambient light measurement is greater than the first threshold and less than the second threshold, that the ambient light sensor was obstructed by a light blocking object.

10. The method of claim 9, further comprising:

repeating in response to detecting that the ambient light sensor was obstructed, causing the mobile device camera to take the picture and storing the picture.

* * * * *